(12) United States Patent
Zellers et al.

(10) Patent No.: US 6,876,906 B1
(45) Date of Patent: Apr. 5, 2005

(54) GRAPHICAL SYMBOLOGY FOR DEPICTING TRAFFIC POSITION, NAVIGATION UNCERTAINTY, AND DATA QUALITY ON AIRCRAFT DISPLAYS

(75) Inventors: Steven M. Zellers, Madison, WI (US); Arlen E. Breiholz, Cedar Rapids, IA (US); Stefan Koczo, Cedar Rapids, IA (US)

(73) Assignee: Rockwell Collins, Cedar Rapids, IA (US)

( * ) Notice: Subject to any disclaimer, the term of this patent is extended or adjusted under 35 U.S.C. 154(b) by 0 days.

(21) Appl. No.: 10/456,695

(22) Filed: Jun. 6, 2003

(51) Int. Cl.[7] ............................................... G06F 19/00
(52) U.S. Cl. ......................................................... 701/3
(58) Field of Search ............................. 701/3–4, 7–10, 701/14–16, 120, 226; 340/945, 947–949, 961, 963–964, 967–980

(56) References Cited

U.S. PATENT DOCUMENTS 6,021,374 A * 2/2000 Wood ......................... 701/301
2002/0120391 A1 * 8/2002 Nehls, III ................... 701/120
2003/0097216 A1 * 5/2003 Etnyre ......................... 701/120
2003/0222795 A1 * 12/2003 Holforty et al. ............. 340/968

* cited by examiner

*Primary Examiner*—Thu V. Nguyen
(74) *Attorney, Agent, or Firm*—Nathan O. Jensen; Kyle Eppele

(57) ABSTRACT

A method of communicating an uncertainty of a location of an object near an aircraft is disclosed. According to the method, a plurality of signals are received from positioning sources. Each of the positioning sources provide information regarding the location of the object. A positional uncertainty of the object is obtained for each of the plurality of signals. Each positional uncertainty is related to an accuracy of the signal to which the respective positional uncertainty relates. The obtained positional uncertainties are combined to derive a combined positional uncertainty of the object having first and second mutually orthogonal directional components. The combined positional uncertainty is expressed as a geometric shape. On a display associated with the aircraft upon which the aircraft and the object are graphically represented, the geometric shape is superimposed on the graphical representation of the object, to thereby apprise a viewer of the positional uncertainty of the object.

15 Claims, 3 Drawing Sheets

GRAPHICAL SYMBOLOGY FOR DEPICTING TRAFFIC POSITION, NAVIGATION UNCERTAINTY, AND DATA QUALITY ON AIRCRAFT DISPLAYS

FIELD OF THE INVENTION

The invention relates to aircraft navigation, and more particularly, to a system and method for depicting local air traffic.

BACKGROUND OF THE INVENTION

Increases in airplane traffic have increased safety concerns, especially around crowded airports and terminals. It is therefore important to provide to an aircraft pilot Cockpit Display of Traffic Information (CDTI), which should present as accurate a picture as possible regarding the position of traffic elements, such as other aircraft, in the area. Several technologies have been developed that may be used to provide real-time positional information and other traffic data for airport surface and terminal area operations. The types of technology available to the modern flight deck may include Automatic Dependent Surveillance-Broadcast (ADS-B), Traffic Information Services-Broadcast (TIS-B), and onboard Traffic Collision and Avoidance System (TCAS) receivers.

One problem with using different types of technology to provide position information traffic elements is that each type of technology has its own accuracy and integrity, which leads to an inherent uncertainty in the true position of the traffic elements. What is needed is a method of communicating the position and positional uncertainty of nearby traffic elements to a pilot of an aircraft.

Another challenge is that there is only a limited amount of display space available for communicating to a pilot the positional uncertainty of nearby traffic elements. If not done properly, adding positional uncertainty to an otherwise information-rich display may run the risk of unnecessarily cluttering up the display space, thereby making it more difficult for a pilot to ascertain necessary information.

It is therefore an object of the invention to provide a method for integrating information obtained from different types of positioning technology to determine the position of a traffic element such as an aircraft.

It is a further object of the invention to provide a method for deriving, from a plurality of different types of positioning technologies, a positional uncertainty of a nearby traffic element.

It is a further object of the invention to increase the situational awareness of a pilot by communicating the position and positional uncertainty of nearby traffic elements in a manner that is easily ascertainable, without unduly cluttering the display space.

A feature of the invention is a geometric figure, overlaid on a depiction of a nearby traffic element on a display, where the geometric figure expresses the combined positional uncertainty of the traffic element as derived from a plurality of positioning technology inputs.

An advantage of the invention is an easily readable symbology scheme that increases situational awareness of a viewer without increasing clutter in the displays space.

SUMMARY OF THE INVENTION

The invention provides a method of communicating an uncertainty of a location of an object near an aircraft. According to the method, a plurality of signals are received from positioning sources. Each of the positioning sources provides information regarding the location of the object. A positional uncertainty of the object is obtained for each of the plurality of signals. Each positional uncertainty is related to an accuracy of the signal to which the respective positional uncertainty relates. The obtained positional uncertainties are combined to derive a combined positional uncertainty of the object. The combined positional uncertainty has a first directional component and a second directional component orthogonal to the first directional component. The combined positional uncertainty is expressed as a geometric shape. On a display associated with the aircraft upon which the aircraft and the object are graphically represented, the geometric shape is graphically superimposed on the graphical representation of the object, to thereby apprise a viewer of the positional uncertainty of the object.

The invention also provides a traffic information system for an aircraft. The system includes a processor, and a plurality of inputs from a corresponding plurality of position sources. Each position source provides position information regarding a traffic object to the processor. A display is operationally connected to the processor and graphically represents a location of the traffic object with respect to a location of the aircraft. A geometrically-expressed positional uncertainty indicator is superimposed upon the graphical representation of the traffic object. The positional uncertainty indicator is derived by the processor from positional uncertainty values associated with each of the plurality of inputs.

The invention further provides a method of communicating an uncertainty of a location of a nearby aircraft. According to the method, a plurality of signals are received from positioning sources. Each of the positioning sources provides information regarding the location of the aircraft. A positional uncertainty of the aircraft is obtained for each of the plurality of signals. Each positional uncertainty is related to an accuracy of the signal to which the respective positional uncertainly relates. The obtained positional uncertainties are combined to derive a combined positional uncertainty of the aircraft. The combined positional uncertainty is expressed as a geometric shape. On a display associated with the aircraft upon which the aircraft is graphically represented, the geometric shape is graphically and semi-transparently superimposed on the graphical representation of the aircraft, to thereby apprise the positional uncertainty of the aircraft to a viewer of the display.

DETAILED DESCRIPTION OF THE DRAWINGS

Figure 1:
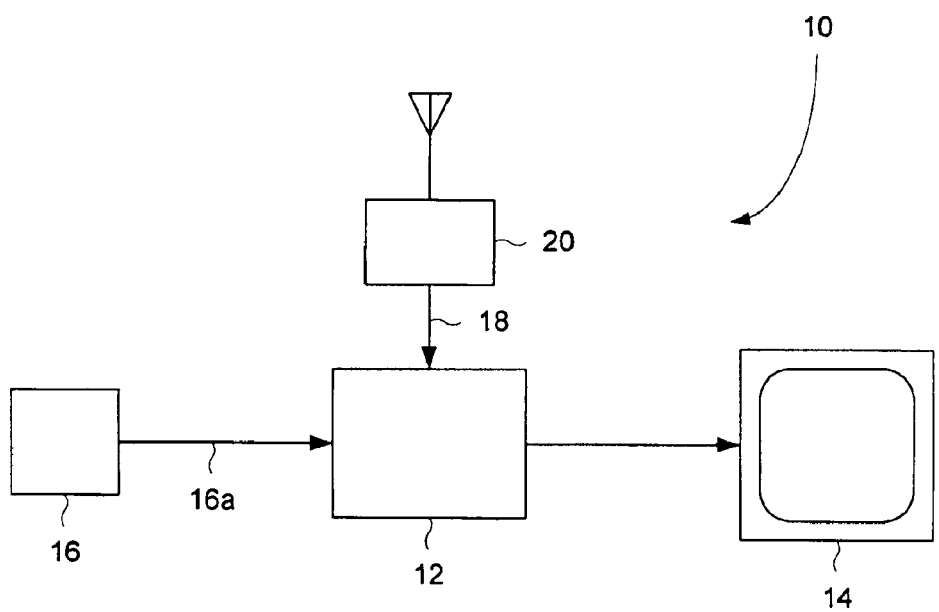
FIG. 1 is a schematic diagram of a system usable for determining and display positional uncertainties according to an embodiment of the invention.

A system usable for determining and displaying positional uncertainties of nearby traffic elements is shown in FIG. 1 and designated generally by reference number 10. System 10 may be part of an avionics system of the type normally found on most commercial aircraft. System 10 includes a processor 12 that processes a plurality of sources or signals from a plurality of inputs and sends signals to a display 14, which provides a visual representation of data relevant to the operation of the aircraft. In the present embodiment, processor 12 accepts signals from input 16a which provides information from onboard Traffic Collision and Avoidance (TCAS) equipment 16. Processor 12 also accepts signals via input 18, which may be connected to a receiver 20 that receives information from Automatic Dependent Surveillance-Broadcast (ADS-B) transmitters on other aircraft. Additionally, input 18 may receive information from Traffic Information Services-Broadcast (TIS-B) transmitters. While a single receiver 20 is shown in FIG. 1, it is to be understood that multiple receivers may be connected, through a like number of inputs, to processor 12. Also, the type and number of inputs may vary as desired.

Each traffic information source provides position data for traffic elements, such as nearby aircraft. As previously stated, each traffic information source comes with its own accuracy and data integrity that leads to an inherent uncertainty in the true position of the traffic element. The accuracy and data integrity for each source is either known and stored in a memory associated with the processor, or may be derived from the signals transmitted through inputs 16a, 18 using known methods. For each traffic element of interest, processor 12 reduces the accuracy positional uncertainties for the traffic element, as obtained for each traffic information source, into a combined positional uncertainty value. This combined positional uncertainty value preferably includes a first linear component measured in a direction of movement of the traffic element, and a second linear component measured in a direction orthogonal to the first component.

Figure 2:
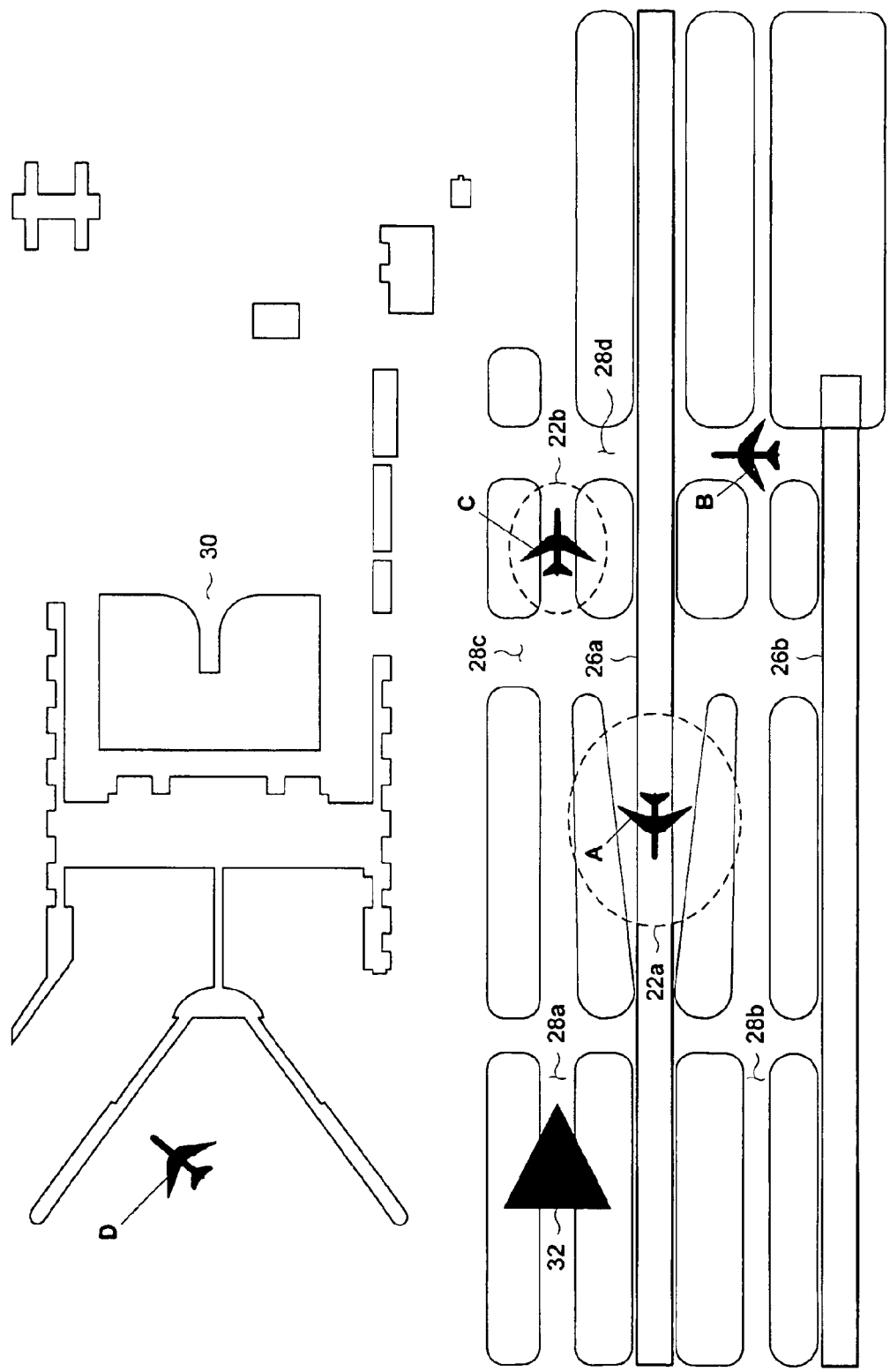
FIG. 2 is an example output of a display according to an embodiment of the invention.

Processor 12 constructs a geometric element that is representative of the magnitude of the combined positional uncertainty value. In a preferred embodiment the geometric element is selected such that the first and second linear components are emphasized. FIG. 2 shows an output of a display in which a geometric element is indicated by reference number 22a and has an elliptical shape. Of course, geometric element 22a may be expressed in other methods and may take other shapes if desired.

The display output shown in FIG. 2 is a representation of an airport, including runways 26a–b, taxiways 28a–d, and a terminal 30. Nearby aircraft A, B, C and D are shown, as well as an 'own ship' indicia 32 representing the own ship, or the aircraft in which system 10 is located. It can be seen that geometric element 22a is overlaid on aircraft A as a semi-transparent or translucent ellipse so that nearby airport features are not obscured. When depicted in this manner, geometric element 22a may be termed an uncertainty 'halo' because it surrounds and highlights aircraft A. Another geometric element 22b is overlaid on aircraft C. It can be seen how geometric elements 22a and 22b communicate to the pilot the two-dimensional positional uncertainty of aircraft A and B.

To reduce required processor operation and to reduce clutter on the display output, it is preferable to only overlay geometric elements on those traffic elements meeting one or more criteria. For instance, an uncertainty halo could be provided only for those aircraft within a predetermined range of the own ship, for instance within one minute at a current taxi speed. Alternately or additionally, an uncertainty halo could be overlaid upon only those aircraft that pose an immediate collision threat, such as aircraft before or behind the own ship on the same taxiway, as shown with aircraft C in FIG. 2. Alternately or additionally, an uncertainty halo could be overlaid upon aircraft for which there a significant ambiguity as to the aircraft's actual position. For example, the uncertainty halo 22a overlaid upon aircraft A graphically demonstrates that the positional uncertainty of aircraft A is large enough for the aircraft to be located on runway 26a, taxiway 28a, taxiway 28b, or taxiway 28c. One or more of these clutter-reducing criteria may be combined to selectively highlight aircraft as shown in FIG. 2. In contrast, uncertainty halos are not overlaid upon aircraft B and D because those aircraft do not satisfy any of the above clutter-reducing rules. Aircraft B, for instance, is not overlaid with an uncertainty halo because (a) it is not on the same taxiway as the own ship, (b) it is beyond a predetermined range from the own ship, and/or (c) the positional uncertainty of aircraft B is small enough that there is no true ambiguity as to its true position.

There is more than one way to use the geometric element to express positional uncertainty of a nearby aircraft. The geometric element may be used to express uncertainty by communicating to the pilot an accuracy level of the position of nearby aircraft, where the accuracy level is calculated to mean there is a certain degree of confidence that the nearby aircraft is within a certain distance from the displayed geometric element (e.g., 95% confidence the aircraft is within 100 meters of the displayed geometric element). Alternatively, the geometric element may express uncertainty by communicating to the pilot a containment bound, where the containment bound is calculated to mean there is a certain probability that the nearby aircraft is within, or not within, the displayed geometric element. For example, the geometric element may be sized such that there is a $10^{-5}$ probability that a displayed nearby aircraft is outside the geometric element overlaid upon it.

The invention thus far has been expressed as having beneficial application to surface operations around airports. The invention may be modified for use in flight by expressing positional uncertainty in three dimensions instead of two dimensions, where a third directional component is used to express positional uncertainty in a direction orthogonal to the first and second directional components as previously described. In a preferred embodiment, the three-dimensional uncertainty is graphically expressed as an ellipsoid surrounding a nearby traffic element. Of course, other three-dimensional shapes may be used as desired. Such a three-dimensional graphical expression of positional uncertainty may have especial utility in areas adjacent airports, where a relatively high amount of aircraft may be preparing for take-off or landing at the airport.

Figure 3:
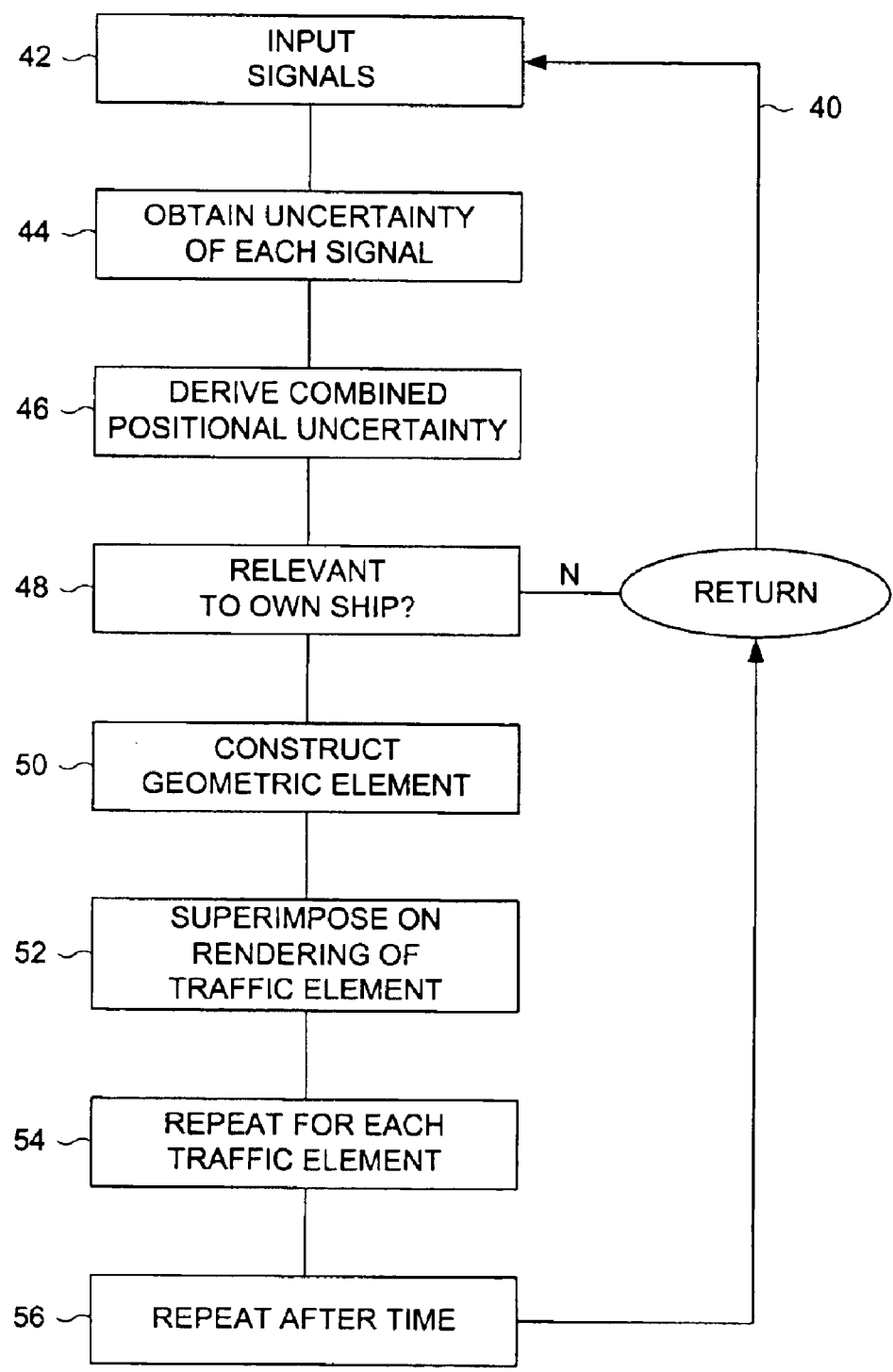
FIG. 3 is a flowchart showing a method of determining and displaying positional uncertainties according to an embodiment of the invention.

FIG. 3 depicts a flowchart of a method 40 of implementing the present invention. In step 42, one or more signals from various sources are input into processor 12. Such sources may include TCAS, ADS-B, TIS-B, or other sources that provide information on a position of a nearby traffic element such as an aircraft. In step 44, the uncertainty for each of the signals is obtained by either deriving the uncertainty from the signals or recalling known uncertainty parameters from a memory associated with processor 12. In step 46, a combined positional uncertainty for the nearby traffic element is derived by combining the uncertainties of the different sources. In step 48, it is determined whether the traffic element is relevant to the anticipated route of the own ship. This may be decided by determining (a) whether the traffic element is within a predetermined range of the own ship, (b) whether the traffic element is positioned upon the same runway or taxiway as the own ship, or is otherwise within the anticipated path of the own ship, and/or (c) whether there is ambiguity as to the true position of the traffic element, notwithstanding the combined positional uncertainty derived therefor. In step 50, a geometric element such as an elliptical or ellipsoidal uncertainty halo is constructed, where the dimensions of the uncertainty halo correspond to orthogonal directional components of the combined positional uncertainty. In step 52, the geometric element is superimposed or overlaid, in semi-transparent fashion, upon a visual rendering of the traffic element to express the positional uncertainty of the traffic element. In step 54, the method is repeated for each traffic element within a predetermined range of the own ship. In step 56, the method is repeated after a predetermined time so that a pilot of the own ship may be apprised of changes in the position of nearby traffic elements.

It is believed that the invention, as described, assists in integrating CDTI into known display formats and displays, in a meaningful way, positional uncertainty of nearby aircraft. Situational awareness of the pilot is thereby increased. While it may not always be displayed during normal operations, graphical depiction of position uncertainty, containment bounds, and integrity provide an indication of data quality that has the potential to improve situational awareness.

Another advantage of the invention is that multiple sources of position information may be used. This is important as varying position-transmitting equipment standards are phased in and out, and provides added integrity for locating the position of nearby aircraft.

Still another advantage of the invention is that the semi-transparent uncertainty halo does not obscure other elements of cockpit display formats. Furthermore, the invention may be programmed to additionally reduce the impact to display formats by displaying uncertainty halos only for traffic elements that are relevant to the anticipated flight path of an own ship.

Yet another advantage is that the uncertainty halo, displays positional uncertainty in more than one direction. This provides a more accurate expression of relevant positional uncertainty.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. A method of communicating an uncertainty of a location of an object near an aircraft, comprising:

receiving a plurality of signals from positioning sources, each of the positioning sources providing information regarding the location of the object;

obtaining a positional uncertainty of the object for each of the plurality of signals, wherein each positional uncertainty is related to an accuracy of the signal to which the respective positional uncertainty relates;

combining the obtained positional uncertainties to derive a combined positional uncertainty of the object, wherein the combined positional uncertainty has a first directional component and a second directional component orthogonal to the first directional component;

expressing the combined positional uncertainty as a geometric shape;

determining if the object is within an anticipated path of the aircraft; and on a display associated with the aircraft upon which the aircraft and the object are graphically represented, graphically superimposing the geometric shape on the graphical representation of the object only when the object is within the anticipated path of the aircraft, to thereby apprise a viewer of the positional uncertainty of the object.

2. The method of claim 1, wherein the combined positional uncertainty is expressed as one of a circle and an ellipse.

3. The method of claim 1, wherein the combined positional uncertainty has a third directional component that is orthogonal to the first directional component and the second directional component.

4. The method of claim 1, further comprising:

displaying a plurality of predefined travel paths; and graphically superimposing the geometric shape on the graphical representation of the object if the combined positional uncertainty of the object is great enough to locate the object on more than one of the plurality of predefined travel paths.

5. The method of claim 1, further comprising:

determining if the object is within a predetermined distance from the aircraft; and graphically superimposing the geometric shape of the graphical representation of the object if the object is within the predetermined distance from the aircraft.

6. A method of communicating an uncertainty of a location of a nearby aircraft, comprising:

receiving a plurality of signals from positioning sources, each of the positioning sources providing information regarding the location of the aircraft;

obtaining a positional uncertainty of the aircraft for each of the plurality of signals, wherein each positional uncertainty is related to an accuracy of the signal to which the respective positional uncertainty relates;

combining the obtained positional uncertainties to derive a combined positional uncertainty of the aircraft;

expressing the combined positional uncertainty as a geometric shape;

determining if the aircraft is within an anticipated path of the own ship;

displaying a plurality of predefined travel paths; and on a display associated with the aircraft upon which the aircraft is graphically represented, graphically and semi-transparently superimposing the geometric shape on the graphical representation of the aircraft if the aircraft is within the anticipated path of the own ship, and graphically superimposing the geometric shape on that graphical representation of the aircraft if the combined positional uncertainty of the aircraft is great enough to locate the aircraft on more than one of the plurality of travel paths, to thereby apprise the positional uncertainty of the aircraft to a viewer of the display.

7. The method of claim 6, wherein the combined positional uncertainty is expressed as a geometric shape having a first directional component and a second directional component orthogonal to the first directional component.

8. The method of claim 7, wherein the combined positional uncertainty is expressed as a semi-transparent ellipse.

9. The method of claim 6, wherein the display is located in an own ship, and further comprising:
   determining if the aircraft is within a predetermined distance from the own ship; and
   graphically superimposing the geometric shape of the graphical representation of the aircraft if the aircraft is within the predetermined distance from the own ship.

10. The method of claim 6, wherein the positioning sources from which the plurality of signals are received include one or more of a Traffic Collision and Avoidance System (TCAS) transponder, a Traffic Information Services—Broadcast (TIS-B) receiver, and an Automatic Dependent Surveillance—Broadcast (ADS-B) receiver.

11. A method of communicating an uncertainty of a location of an object near an aircraft, comprising:
   receiving a plurality of signals from positioning sources, each of the positioning sources providing information regarding the location of the object;
   obtaining a positional uncertainty of the object for each of the plurality of signals, wherein each positional uncertainty is related to an accuracy of the signal to which the respective positional uncertainty relates;
   combining the obtained positional uncertainties to derive a combined positional uncertainty of the object, wherein the combined positional uncertainty has a first directional component and a second directional component orthogonal to the first directional component;
   expressing the combined positional uncertainty as a geometric shape;
   displaying a plurality of predefined travel paths; and
   on a display associated with the aircraft upon which the aircraft and the object are graphically represented, graphically superimposing the geometric shape on the graphical representation of the object if the combined positional uncertainty of the object is great enough to locate the object on more than one of the plurality of predefined travel paths, to thereby apprise a viewer of the positional uncertainty of the object.

12. The method of claim 11, wherein the combined positional uncertainty is expressed as one of a circle and an ellipse.

13. The method of claim 11, wherein the combined positional uncertainty has a third directional component that is orthogonal to the first directional component and the second directional component.

14. The method of claim 11, further comprising:
   determining if the object is within an anticipated path of the aircraft; and
   graphically superimposing the geometric shape on the graphical representation of the object when the object is within the anticipated path of the aircraft.

15. The method of claim 11, further comprising:
   determining if the object is within a predetermined distance from the aircraft; and
   graphically superimposing the geometric shape of the graphical representation of the object is within the predetermined distance from the aircraft.

* * * * *